United States Patent

[11] 3,617,609

| [72] | Inventor | Paul D. Tuttle<br>Marshall, Tex. |
|---|---|---|
| [21] | Appl. No. | 90,907 |
| [22] | Filed | Nov. 19, 1970 |
| [45] | Patented | Nov. 2, 1971 |
| [73] | Assignee | Aluminum Company of America<br>Pittsburgh, Pa. |

[54] CONDUCTOR VIBRATION DAMPING DEVICE
7 Claims, 4 Drawing Figs.

[52] U.S. Cl. .................................................. 174/42,
174/146, 188/1 B
[51] Int. Cl. ...................................................... H02g 7/12,
H02g 7/14
[50] Field of Search ........................................... 174/42,
146; 188/1 B

[56] References Cited
UNITED STATES PATENTS
2,973,402 2/1961 Taylor ......................... 174/146 X

| 3,121,770 | 2/1964 | Dallye .......................... | 174/42 |
|---|---|---|---|
| 3,454,705 | 7/1969 | Crosby et al. ................ | 174/42 |
| FOREIGN PATENTS | | | |
| 219,117 | 1/1962 | Austria ......................... | 174/146 |
| 1,563,904 | 3/1969 | France ......................... | 174/146 |
| 1,084,102 | 9/1967 | Great Britain ................ | 174/146 |
| 1,098,813 | 1/1968 | Great Britain ................ | 174/146 |
| 396,125 | 1/1966 | Switzerland .................. | 174/146 |

Primary Examiner—Laramie E. Askin
Attorney—E. Strickland

ABSTRACT: A device for damping mechanical vibrations of a conductor, the device including a body member and at least one member for clamping the conductor, one of the members having opposed arms or wall structures spaced from and located respectively on at least two sides of an arm of the other member. The arms of the two members are mechanically and resiliently connected together by at least two close wound springs, the longitudinal axes of the springs extending between the spaced arms of the one member and through the arm of the other member. Further, the springs are spaced along the length of the arms.

INVENTOR.
PAUL D. TUTTLE
BY E. Strickland
Attorney

INVENTOR.
PAUL D. TUTTLE
By E. Strickland
Attorney

3,617,609

CONDUCTOR VIBRATION DAMPING DEVICE

BACKGROUND OF THE INVENTION

The present invention relates generally to vibration damping devices, and particularly to a damping device in which the lateral shear of a close wound spring provides damping action for a conductor mechanically connected thereto.

As is well known in the art, cables and conductors that are supported at spaced-apart locations are subjected to fault conditions corona discharge and/or air currents moving across them which tend to move and vibrate such cables and conductors. If the period of vibration caused by the air currents moving across a conductor coincides with the natural period or harmonic thereof, the conductor is then subjected to a sustained mechanical vibration or oscillation which causes a continuously repeated bending of the conductor at its support locations. Such bending of the conductor fatigues the metal thereof with consequent eventual failure of the conductor at one or more of the support locations. Further, such conductor movement causes wear on its associated and supporting hardware.

Conductor vibration and oscillation can occur with bus conductors supported at spaced locations, single conductors supported between towers or poles, and bundle conductor arrangements in which individual subconductors are retained in spaced parallel relation by means of bundle suspension brackets at the towers and by spacer devices clamped to the subconductors at locations between the towers. The spacers and brackets used to retain bundle subconductors in their spaced relationship with each other tend to confine and store the energy of conductor vibration to a subspan area, i.e., a finite length of the bundle between two adjacent spacers or an adjacent bracket and spacer. The stored energy permits the conductor vibrations to be self-exciting and sustaining.

Over the years a number of devices have been developed for damping conductor vibrations, including spacer-damper devices employed to simultaneously space and damp bundle conductor arrangements.

With this development, a category of materials that has found extensive use is the elastomers, such as synthetic and natural rubbers. Elastomers generally have a hysteresis characteristic which, with distortion of the material, functions to dissipate vibration energy in the form of heat as it seeks to regain its nondistorted configuration.

Elastomers, while having certain advantages, have disadvantages which render them less than desirable for use in devices for damping overhead conductors. For example, the physical and resilient characteristics of elastomers tend to change with time and exposure to the sun and other elements of weather. They are, for example, temperature sensitive, i.e., they tend to soften with increases in temperature, and harden with decreases in temperature. Since the overhead conductors tend to contract and thus tighten with lower temperature conditions, they tend to vibrate more easily under such temperature conditions thereby requiring a more compliant damping material to provide effective damping. With elastomers, however, as explained above, the reverse is the case so that they offer less damping capabilities in colder weather, and more damping capability in hot weather when less is needed.

In contrast to elastomer materials, metal springs do not generally possess a hysteresis characteristic with mere bending of the spring metal so that it does not inherently perform as damping function. Springs are used, however, in damping devices and arrangements, for example, to resiliently support a mass for impact againsta stop or abutment means with vibration of a cable (to which the spring is attached), the impacts providing the dissipation of vibration energy in the form of heat.

In addition, metal springs have been used as spacer elements for bundle conductors, for example, as shown in the Dallye U.S. Pat. No. 3,121,770. The spacer disclosed therein includes at least one elongated close-coil spring which can be provided with a damping characteristic by use of the separate damping medium, such as a flowable granular substance located within the bore of the spring. Further, with torsional or twisting movement of the coil spring, intercoil friction occurs which can provide additional damping when the movement of the subconductors is such that the spring is twisted.

As explained above, metal springs themselves ordinarily provide little in the way of damping. The damping provided with torsional twist of a close-coil spring, such as shown in the Dallye patent, is a small amount in comparison to the damping needs of suspended conductors such as overhead transmission lines. Metal springs, however, because of their durability and their more constant physical and resilient characteristics in varying weather conditions and temperatures, are a preferable mechanism for damping purposes when they can be made to be effective, efficient dampers.

BRIEF SUMMARY OF THE INVENTION

The present invention is directed to the use of close-wound helical springs as the mechanism for damping conductor vibrations in a manner that is highly effective and efficient. This is accomplished by connecting the springs to the conductor in such a manner that with the conductor movement or vibration, the coils of at least one spring are translated laterally, i.e., translated in a direction perpendicular to the longitudinal axis of the spring. With the coils of spring pressing against each other under an initial force and tension as manufactured, the lateral relative translation of adjacent coils provides friction therebetween which is highly effective in generating heat as the means for dissipating the energy of conductor vibration. By this means, conductor movement is rapidly stopped so that the wear and fatigue of the conductor, and its associated hardware including the damping springs themselves, are reduced to negligible amounts.

As can be appreciated, springs do not change substantially in their mechanical and resilient characteristics with exposure to and changes in the weather and/or temperature, there is little or no accumulation of heat in the springs since any air currents causing conductor vibration cool the springs, and the spring motion of the present invention functions to damp a broad range of conductor vibrations since any motion of the conductor that will translate laterally the coils of the springs will also cause intercoil friction to damp the conductor motion. Thus, the damping afforded by the present invention is effective to damp aeolian (high-frequency low-amplitude) vibrations, galloping (which is a low frequency high-amplitude motion of ice-coated conductors), and oscillation or bare-wire galloping, a low-frequency, moderate amplitude motion of bare conductors resulting from aeroelastic instabilities associated with boundary layer transition.

THE DRAWINGS

The invention, along with its advantages and objectives, will best be understood from consideration of the following detailed specification and the accompanying drawings in which:

FIG. 2 is a plan view of the damping spacer of

Figure 1:
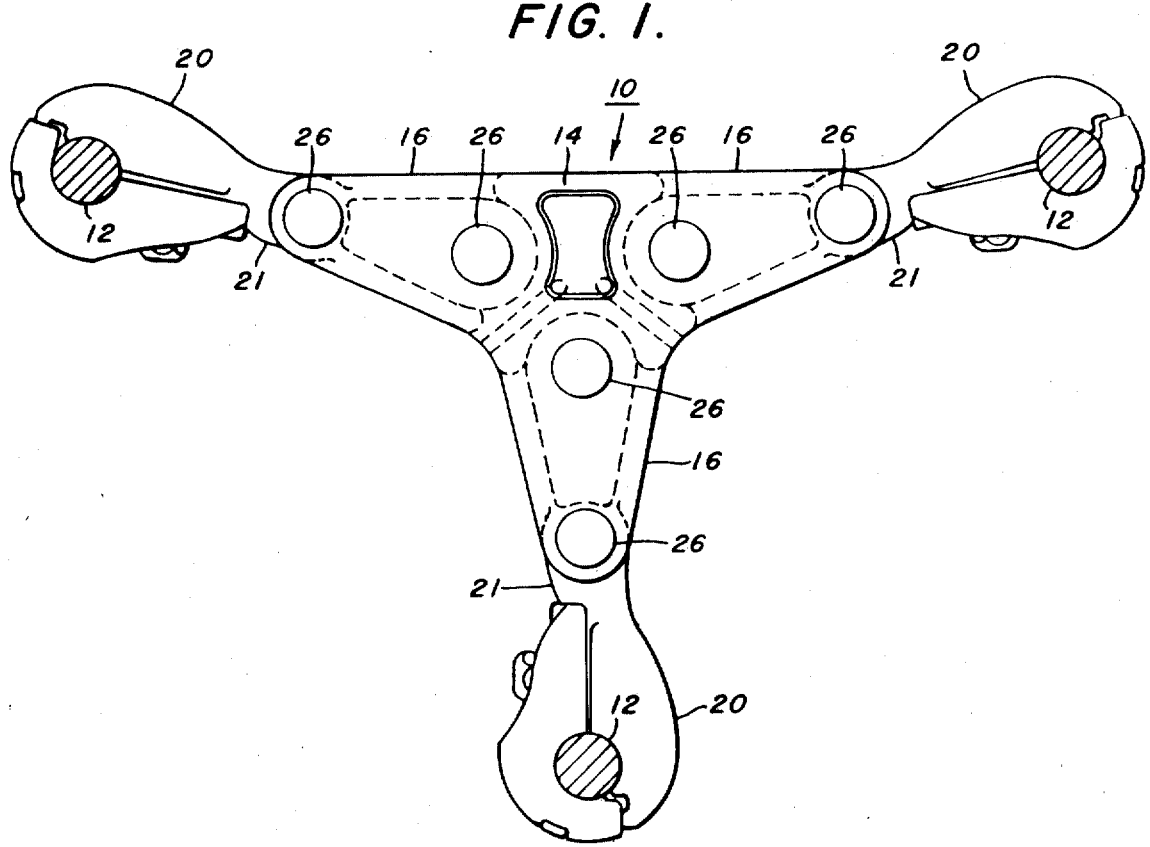
FIG. 1 is a side elevation view of a damping spacer constructed in accordance with the principles of the invention as applied to parallel subconductors of a three conductor bundle arrangement.
Figure 3:
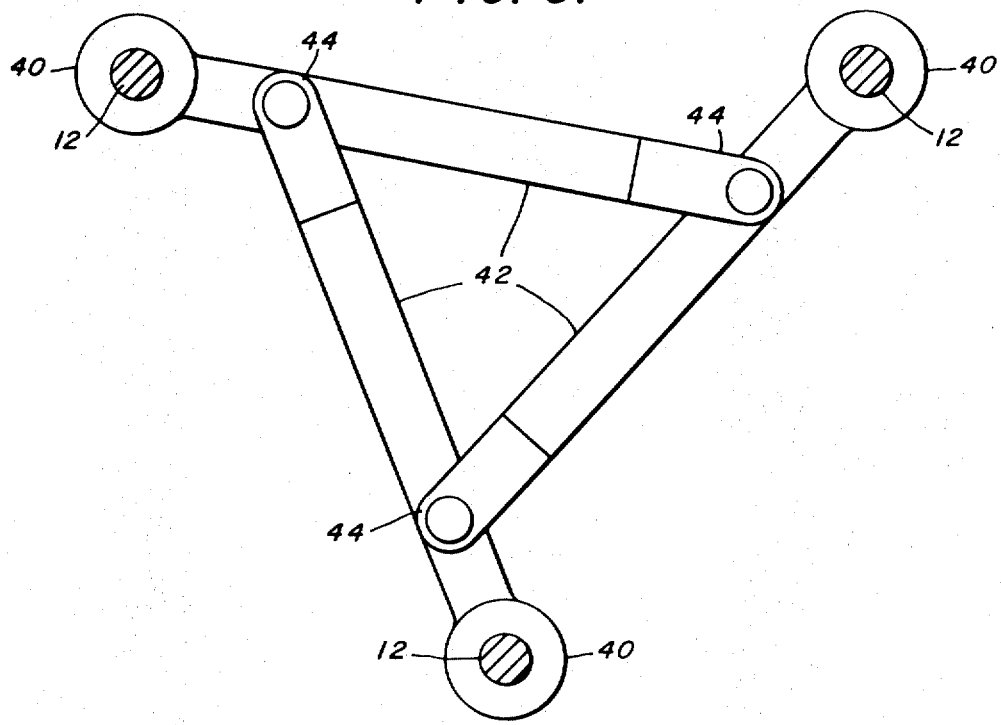

FIG. 1 with one of the springs thereof shown in vertical section;

FIG. 3 is a side elevation view of a second embodiment of the invention; and

Figure 4:
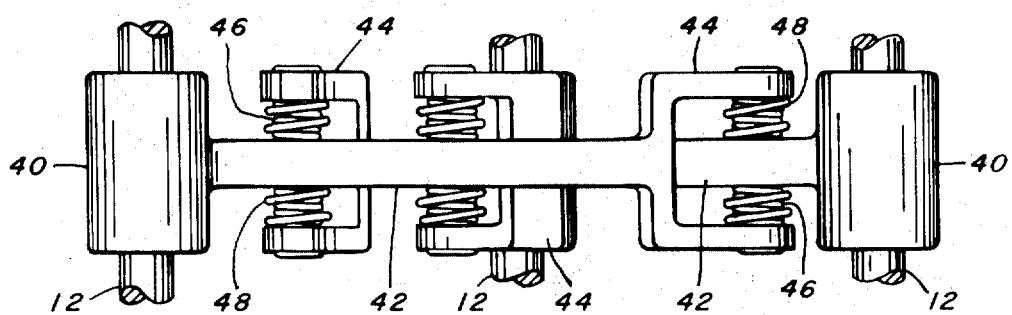

FIG. 4 is a plan view of the embodiment of FIG. 3.

PREFERRED EMBODIMENTS

Figure 2:
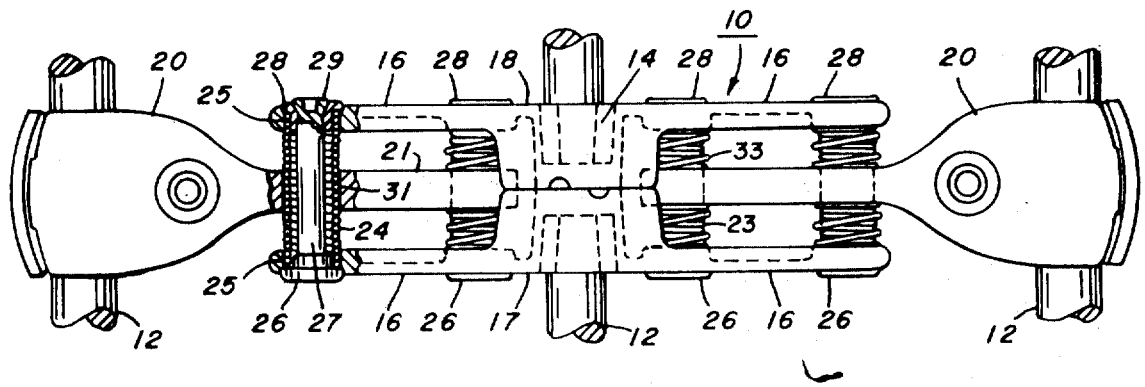

Referring now to FIG. 1 of the drawings, a damping spacer embodiment 10 of the invention is shown clamped to three subconductors 12 of a bundle conductor arrangement. The damping spacer includes a main body portion or member 14 having three pairs of spaced apart, essentially parallel arms 16 extending outwardly toward respective subconductors 12. As shown in FIG. 2, the body member may comprise two half portions 17 and 18, fitted together to form the main body member 14 with each of the arms 16 on one side thereof being an integral part of the half portion.

The damping spacer 10 includes further a clamping member 20 for each of the conductors 12, the clamping members in FIG. 1 being shown clamped to the conductors. Each of the clamping members has a single, elongated arm 21 associated with a respective pair of the spaced arms 16, as best seen in FIG. 2, the arm 21 extending between and essentially parallel to the spaced arms. In accordance with the invention, each clamping member is connected to the body member by at least two close wound helical springs 23 and 24 extending between the arms 16 of the body member and through the arm 21 of the clamp, the longitudinal axes of the springs extending in a direction essentially perpendicular to the axes of the arms.

In FIG. 2, spring 24 is shown in section to show more clearly the relationship of the springs to the arms of the body and clamping members 14 and 20. As shown, the coils adjacent the opposed ends of the springs 24 are located in bores 25 provided in the arms 16, and centered therein by the head 26 of a pin 27, the head seated in and engaging one of the arms 16, and a shank portion of the pin extending into the bore of spring at one end thereof. At the other end thereof, the pin 27 extends through the other arm 16 and through a cap member 28 fixed to the pin by the end 29 of the pin which is suitably flared behind the cap member. The cap member, like that of the head of the pin, has a shank portion which extends into the end of the spring 24 to center and secure it within the bore 25 of the arm 16. In the embodiment shown in FIGS. 1 and 2, the pins 27 and cap members 28 also secure the half portions 17 and 18 together of the main body member 14.

As with the bores 25 in the arms 16, the arms 21 of the clamps 20 each have bores 31, only one of which is shown in FIG. 2, through which the springs 23 and 24 respectively extend. In this manner, the clamp and main body member 14 of the damping spacer 10 are resiliently connected together through the springs need not extend completely through the arms 21 as explained hereinafter.

With any motion or vibration of any one of the conductors 12 in any direction perpendicular to its longitudinal axis, the arm 21 of the clamp 29 moves to translate at least one of the springs 23 or 24 in a direction substantially perpendicular to the longitudinal axis of the spring. With such translation of the spring or springs, intercoil friction occur which dissipates rapidly the energy of the conductor motion or vibration in the form of heat which functions to quickly stop conductor movement. If the conductor vibration is caused by air currents moving across the conductor, these same air currents cool the damping springs, the outside surfaces of the springs being exposed to the air currents. The result is a rapid dissipation of vibration energy and therefore rapid damping for wind-induced vibrations.

In general, the amount of damping action provided by the springs 23 and 24 depends upon the material and size of the wire and the force with which the turns of the springs press against each other, this latter factor being controlled by the art of making springs. The material and size of the springs, and the tension thereof, are, of course, chosen to provide optimum damping action for a particular conductor size, weight and tension.

As can be appreciated, any motion of a conductor 12 in a direction perpendicular to its longitudinal axis sufficient to cause lateral translation of the coils of the camping springs 23 and/or 24 will be damped by the resulting intercoil friction. Thus, the damper of the present invention is operative as a damper over a broad range of conductor vibration and galloping phenomena as explained earlier. If the energy of the conductor movement is sufficient to move the damping spring or springs, the spring or springs will in turn damp the conductor movement.

Where the motion of a conductor 12 causes its associated clamp 20 to pivot about one of the springs 23 or 24, the arm 21 of clamp 20 will move the other spring so that damping action is always insured. Where the axes of relative rotation of the arms 21 are at locations other than the springs, or where the motion of the clamp is along the axes of the arms 16 and 21, both springs function to dampen conductor movement.

In the embodiment of the invention as thus far described and as depicted in the drawing, two damping springs (23 and 24) are shown for each extremity of the main body member 14, the axes of the springs being essentially parallel to each other and to the conductors 12, and extending completely through the arms 21 of the conductor clamps 20. The invention, however, is not limited to such an arrangement. For example, additional damping springs can be used, and one or more springs disposed at right angles to the axes of the springs 23 and 24 and to the axes of the arms 16 and 21. In FIG. 2, such a spring or springs would extend into the plane of the paper and be supported by a structure integral with body portion 14 of the damper 10. Such a spring or springs would function to provide damping action with movement of a conductor 12 along its longitudinal axis, which movement would cause the arm 21 of the conductor clamp to move laterally along the springs 23 and 24.

Further, the damping springs 23 and 24 need not comprise single-spring elements extending completely through each arm 21 of each conductor clamp 20. A damping spring may comprise two axially aligned springs longitudinally separated by the arm of the conductor clamp so that only the axes of the springs would extend through the arm and between the opposed inside wall surfaces of the spaced arms 16. The inner ends of such springs could be located within countersunk bores provided in the sides of the arm 21 facing the arms 16 as the means of retaining the springs between the arm 21 and the arms 16. Lateral motion for the clamp and clamp arm could be provided by providing the springs with open wound spring portions at the ends thereof located in the arms 16 or 21 or both.

In the embodiment shown in FIGS. 1 and 2, the bores 31 in the clamp arm 21 allow the arm to move laterally along the damping springs 23 and 24 with any longitudinal motion of its associated conductor 12. To maintain the clamp arms in an essentially center location along the length of the damping springs while allowing lateral movement of the clamps with longitudinal movement of the conductor, open wound helical springs 33 are located around the damping springs on each side of the arm, the open wound springs extending between the arms 16 of the body member 14 and the arm 21 of the clamp. With longitudinal movement of a conductor 12, and thus lateral movement of the conductor clamps 20, the open wound springs 33 comply with such movement but operate to return the clamps to their neutral or center position on the damping springs when the longitudinal movement of the conductor ceases. Such centering of the clamp arms optimizes the opportunity for lateral translation of the coils of the springs when the conductor moves thereby providing optimum damping capabilities. Other centering means may be employed, however, such as the open wound spring end portions described above in connection with the spring arrangement separated by the arm 21.

Further, any friction between the open springs 33 and the damping springs 23 or 24 functions to dampen conductor movement.

In the embodiment of the invention shown in FIGS. 1 and 2, the damping springs 23 and 24 can be held by a structure other than a pair of spaced arms 16. For example, a housing structure may be used (in place of the arms) which would enclose the area surrounding the springs and the arm 21. With such a structure, the springs could nevertheless be mounted substantially as shown in FIG. 2, the function of the spaced arms being now performed by the walls of the housing. The open wound springs 33 would then extend between opposed wall surfaces of the housing.

In a similar vein, the spaced arms 16 and the single arm 21 may be reversed in the order of their association with and respect to the body member 14 and the conductor clamp 20, i.e., the single arm be an integral part of the body member 14, and the spaced arms be an integral part of the conductor clamp.

FIGS. 3 and 4 of the drawings show another preferred embodiment of the invention in which damping action is provided in spacer structure by relative coil displacement of close wound springs with vibration movement of an associated conductor. In FIG. 3, three clamping members 40 are shown clamped to electrical conductors 12 (as in FIG. 1), the clamping members each having a body member in the form of a single, elongated arm 42 and a pair of spaced apart, essentially, parallel arm portions 44 (Fig. 4) at the end of each single arm remote from its associated conductor clamp.

As shown in FIGS. 3 and 4, a damping spacer is formed by disposing the three clamping members in such a manner that the single arms 42 of the clamping members form a triangle, with the arms extending between the parallel arm portions 44 of an adjacent member at a location near the conductor end of each member, and resiliently connecting the arms together at such locations by close wound springs 46 extending between the parallel arm portions and through the single arm located there between. In this manner, the body members of each conductor clamp is provided with at least two resilient connections, i.e., a resilient connection near the conductor clamp, and a resilient connection adjacent the end of the single arm remote from the conductor clamp. The axes of the close wound springs extend perpendicular to arms of each clamp, and the springs are preferably secured to the arms of the clamp in the manner described above in connection with FIGS. 1 and 2, i.e., with a pin (not shown) extending through the arms and through the bore of each spring. Similarly, to allow relative movement of the single arms 42 along their respective springs 46, open coil springs 48 are disposed around the springs 46, and extend between the single arm 42 and the inside wall surfaces of the parallel arm portions 44.

The operation of the structure shown in FIGS. 3 and 4 is similar to that of the embodiment of FIGS. 1 and 2. With a motion of a conductor 12 of sufficient force to overcome the initial coefficient of friction existing between the turns of an associated spring 46, the turns are relatively translated perpendicular to the axis of the spring to provide friction therebetween, which friction dissipates the energy of the conductor motion in the form of heat thereby providing damping action. If the motion of the conductor is such that it rotates about the axis of one spring 46, the other spring 46, spaced therefrom along the arm 42, is moved by the arm. If the motion of a conductor is along the axis of the arm of its associated clamp, then both springs (i.e., the spring adjacent the clamp and the spring adjacent the end of the arm remote from the clamp) are translated in direction perpendicular to their longitudinal axes.

From the foregoing description, it should now be apparent that a new and useful device has been disclosed for efficiently damping the movement and vibration of conductors supported along their length at spaced-apart locations. This is accomplished by the use of close wound springs resiliently connecting a conductor clamp to a body or arm member in a manner that causes displacement of the coils of the springs in planes perpendicular to their axes when the conductor vibrates. With relative coil displacement, intercoil friction occurs which functions to rapidly dissipate the energy of the vibrations in form of heat.

Though the invention has been described with a certain degree of particularity, changes may be made therein without departing from spirit and scope thereof. For example, the invention is not limited to a three conductor bundle spacer damper device. The device may be employed to damp only a single conductor (in which case conductor spacing would not be a factor ), and the device may be used to space and damp two, four or more subconductors of a bundle arrangement.

In a similar vein, the damping springs need not be made of a round or circular cross section wire. Flat, rectangular or square wire may be used to increase the area of contact between turns of the springs resulting in an increase in intercoil friction with vibration of a clamped conductor.

What is claimed is:

1. A conductor vibration damping device comprising:
   a body member and a conductor clamping member, one of said members having a structure providing opposed wall surfaces spaced from and located respectively on at least two opposed sides of an arm of the other said member, and
   at least two close wound springs mechanically and resiliently coupling said members together, the longitudinal axes of said springs extending between said opposed wall surfaces of said one member and through said arm of said other member in a direction substantially perpendicular thereto, and at spaced apart locations therealong.

2. The structure of claim 1 including means allowing relative resilient movement between the members lengthwise of the close wound springs.

3. The structure of claim 1 in which open coil springs are disposed about the close wound springs between the surfaces of said one member and the arm of said other member, said open coil springs allowing resilient motion of the arm along the close wound springs.

4. The structure of claim 1 in which the opposed wall structures of the one member are part of an enclosure enclosing at least a portion of the arm of said other member.

5. A conductor spacer and vibration damping device comprising
   a body member and conductor clamping members disposed adjacent the extremities of said body member, one of said members have at least two spaced arms spaced from and located respectively on at least two sides of an arm of said other member, and
   at least two close wound springs mechanically and resiliently coupling said members together, the longitudinal axes of said springs extending between the two spaced arms of said one member and through the arm of said other member in a direction substantially perpendicular thereto, and at spaced-apart locations therealong.

6. A conductor spacer and vibration damping device comprising
   at least two conductor clamping members, each of said clamping members having associated therewith a single arm and at least two, essentially parallel arm portions, the parallel arm portions of one of said clamping members being spaced from and located respectively on at least two opposed sides of the single arm of the other of said clamping members, and
   at least one close wound spring mechanically and resiliently coupling said members together, the longitudinal axis of said spring extending between the two spaced arm portions of said one member, and through the single arm of said other member in a direction substantially perpendicular thereto.

7. The structure of claim 6 in which the number of the conductor clamping members is at least three, with the single arm of each of said clamping members having the parallel arm portions adjacent the end thereof remote from the conductor, the parallel arm portions of each clamping member being coupled by at least one close wound spring to the single arm of an adjacent one of said clamping members extending between the parallel arm portions.

* * * * *